DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1231

T900,021

METHOD FOR PREPARING FIRE RETARDANT POLYESTER FIBERS

John R. Caldwell, 404 Colonial Heights Road 37663, and Winston J. Jackson, Jr., 4408 Green Springs Circle 37664, both of Kingsport, Tenn.

Continuation-in-part of application Ser. No. 790,870, Jan. 13, 1969. This application May 11, 1971, Ser. No. 142,356

Int. Cl. B32b *27/36;* C09k *3/28*

U.S. Cl. 117—136

No Drawing. 24 Pages Specification

Disclosed is a process for preparing fire retardant polyester fibers comprising applying to the surface of the polyester fiber an organic bromine compound that does not chemically react with the polyester and subsequently heating the fiber in a temperature range of about 175 to about 220° C. to diffuse the organic bromine compound into the fiber. Advantageously, the toughness of the fiber is reduced not more than 30.0% by this process and the organic bromine compound is retained in the fiber after laundering and dry cleaning. Poly(ethylene terephthalate) and poly(1,4-cyclohexylenedimethylene terephthalate) fibers are particularly desirable polyester fibers. Tris(2,3-dibromopropyl) phosphate is a particularly desirable organic bromine compound.